No. 699,010. Patented Apr. 29, 1902.
F. B. POPE.
MANUFACTURE OF SEED PRODUCTS.
(Application filed Apr. 4, 1901.)
(No Model.)
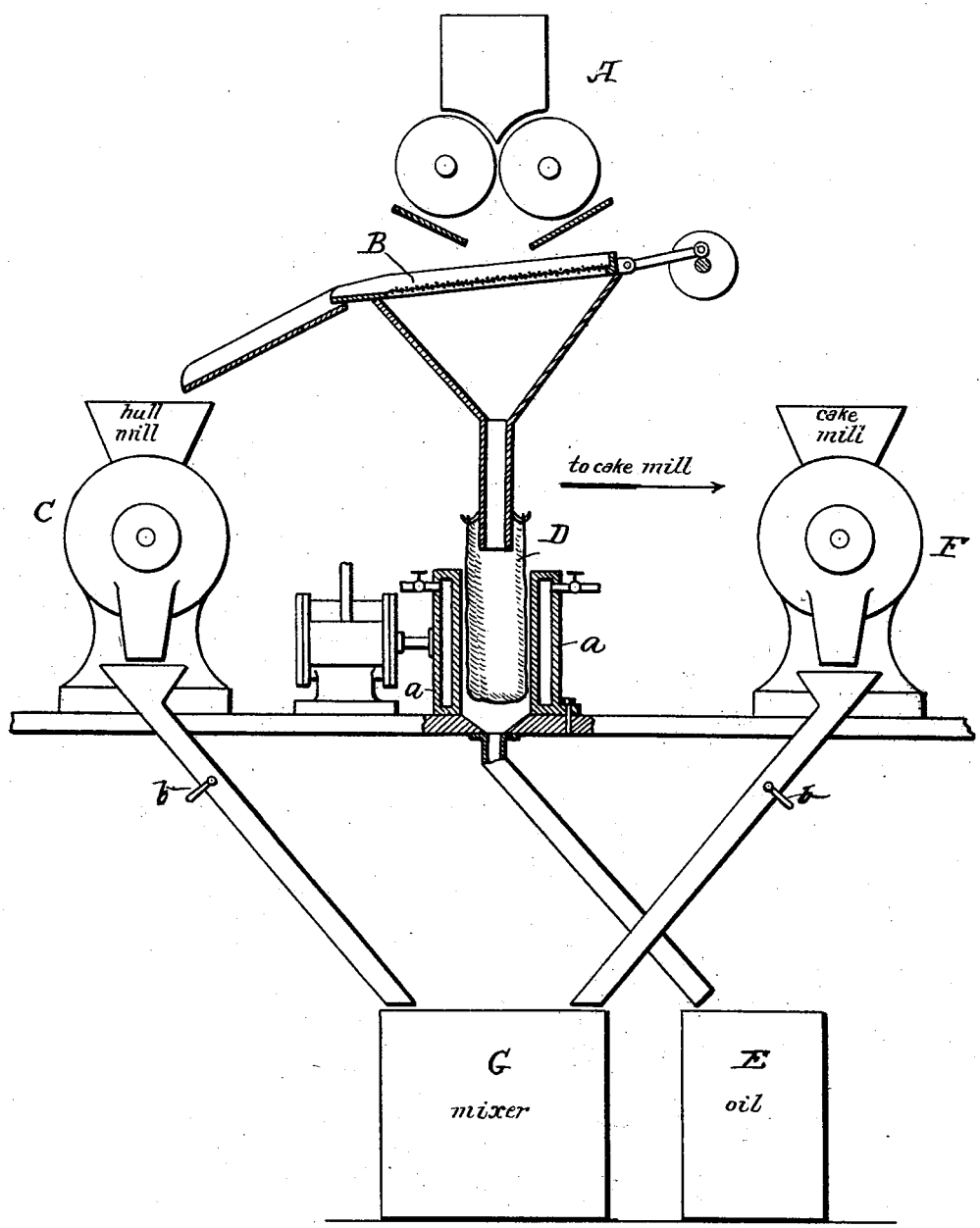

UNITED STATES PATENT OFFICE.

FREDERICK B. POPE, OF AUGUSTA, GEORGIA.

MANUFACTURE OF SEED PRODUCTS.

SPECIFICATION forming part of Letters Patent No. 699,010, dated April 29, 1902.

Application filed April 4, 1901. Serial No. 54,384. (No specimens.)

*To all whom it may concern:*

Be it known that I, FREDERICK B. POPE, a citizen of the United States, residing at Augusta, in the county of Richmond and State of Georgia, have invented certain new and useful Improvements in the Manufacture of Seed Products, of which the following is a specification.

Under the laws of some of the States of the United States it is required that seed products, especially cotton-seed products, intended for food or fertilizing purposes shall contain a certain percentage of nitrogen. Heretofore it has been endeavored to secure a product with the desired percentage of nitrogen by first combining a certain proportion of hulls and a certain proportion of kernels in a mixture and then grinding the two together with the purpose that the nitrogen in kernels shall afford the proper proportion in the finished product. This is done before the material is subjected to action in the press or other apparatus used for the purpose of extracting the oil, and it has been found that under such a treatment it is impossible to operate so as to secure a product of any determined or definite constituents, and consequently if, as is generally the case, the product is deficient in nitrogen or has a surplus it is necessary to add additional hull or additional kernel and carry the material again through an attrition-mill or mixer, and frequently this has to be done several times before the desired result is attained.

The object of my invention is to so operate upon the material that it is possible to produce absolutely the product without remixing with any desired proportion or percentage of nitrogen, and to this end I treat the material in its natural dry state in the first instance, completely so far as practicable separate the kernels and the hull portion of the seed, then operate upon the kernels as required to extract the oil, and then reduce the cake or body of the kernel left after the oil is extracted to a meal, which meal is combined in any desired proportion with a meal which is produced separately from the dry hulls wholly and entirely separated from the fibers. By suitable tests the amount of nitrogen contained in a given quantity of the kernel-meal is determined, and then by mixing the required proportion of hull-meal therewith a product is secured having the definite portion of nitrogen which has been determined upon. In thus preparing the seed product I not only secure definite results and avoid the necessity of repeated manipulation and tests, but I am enabled to secure other advantages which result in great saving of time, labor, and expense of manufacture, inasmuch as by the complete separation of the hulls and kernels in the first instance I avoid the necessity of crushing or grinding up the hulls with the kernels, and consequently make use of much lighter and less expensive crushing appliances. The material is heated and then pressed; but less time is required than usual to heat the material prior to pressing, while injury to the press and to the press-cloth from the presence of the hulls is avoided. Further, in consequence of the absence of the hull from the compressed mass or cake the latter can be much more readily broken up and ground to a meal, and lighter and less expensive machinery may be used than heretofore.

I am aware that it has been proposed that the kernels and associated hulls be washed and practically separated and the kernels treated by drying and pressing to extract the oil and the kernel cake and divided hull mixed. This process will not secure the results attained by me. It is not only expensive from the necessity of using expensive drying apparatus, but the water is discolored by matter extracted from the particles of hull associated with the kernels, and this water discolors the kernels and the oils extracted therefrom, and the action of the water sets free fatty acids in the hulls and kernels, and this also discolors the oil and depreciates the value of the same. The drying of the hull portion destroys its efficiency as a food for stock. The heat of drying also dries out all of the oil, a certain proportion of which must remain or the cattle will not eat it.

By my process I act on the material in its natural substantially dry condition. I separate to a substantial extent the kernels and the hulls and act on each separately. The oil is extracted by pressing the kernels alone and the hulls are ground separately, and then the two are mixed after tests which indicate the proper proportions to be combined.

While I have referred specially to the treatment of cotton-seeds, I contemplate applying my invention in connection with other seeds having kernels and hulls from which separate meals may be made.

While any desired arrangement of apparatus may be used in carrying out my invention, I have shown in the accompanying drawing a mill A, which cracks the hulls, and a sieve B, which sifts the hulls from the kernels, the latter being directed to a grinding-mill C, which reduces them to meal. The hulls fall into a bag D, which is squeezed between the hollow steam-heated platens $a\ a$ of a press, the oil passing to a tank E. After the oil is thus extracted the cake is transferred to a mill F and there ground, the meal passing to a receptacle G and mixing therein with that from the mill C. Valves $b$ regulate the flow of the meals.

Without therefore limiting myself to the use of any special apparatus or to any specific proportions of materials, I claim—

In the manufacture of seed products, first treating seeds in their natural dry condition to separate the hulls and kernels, then heating and pressing the kernels to extract the oil, and grinding the cake to form a meal and combining the same with a meal formed from the hulls, substantially as set forth.

In testimony whereof I have signed my name to this specification in the presence of two subscribing witnesses.

FREDERICK B. POPE.

Witnesses:
 FRANK D. BLACKISTONE,
 H. M. GILLMAN, Jr.